United States Patent
Auvinen et al.

(10) Patent No.: US 10,099,872 B2
(45) Date of Patent: Oct. 16, 2018

(54) TRANSFER PLATE FOR LOADING A CARGO SPACE

(71) Applicant: ACTIW OY, Naarajarvi (FI)

(72) Inventors: Janne Auvinen, Pieksamaki (FI); Otto Utriainen, Montola (FI)

(73) Assignee: ACTIW OY, Naarajarvi (FI)

( * ) Notice: Subject to any disclaimer, the term of this patent is extended or adjusted under 35 U.S.C. 154(b) by 155 days.

(21) Appl. No.: 14/910,821

(22) PCT Filed: Sep. 16, 2014

(86) PCT No.: PCT/FI2014/050706
§ 371 (c)(1),
(2) Date: Feb. 8, 2016

(87) PCT Pub. No.: WO2015/040275
PCT Pub. Date: Mar. 26, 2015

(65) Prior Publication Data
US 2016/0194165 A1    Jul. 7, 2016

(30) Foreign Application Priority Data
Sep. 17, 2013   (FI) ..................................... 20135931

(51) Int. Cl.
*B65G 67/02*   (2006.01)
*B65G 67/20*   (2006.01)
*B65G 69/22*   (2006.01)

(52) U.S. Cl.
CPC ............. *B65G 67/02* (2013.01); *B65G 67/20* (2013.01); *B65G 69/22* (2013.01)

(58) Field of Classification Search
CPC ........ B60P 1/52; B60P 3/1066; B65D 88/546; B65G 13/11; B65G 13/12; B65G 67/20; B65G 69/22; B65G 69/24; B65G 69/26; B65G 67/02
USPC ..... 193/37, 35 A, 35 SS; 414/532, 535, 536, 414/498
See application file for complete search history.

(56) References Cited

FOREIGN PATENT DOCUMENTS

| | | |
|---|---|---|
| EP | 1808387 | 7/2007 |
| WO | 0119712 | 3/2001 |
| WO | 2005080132 | 9/2005 |
| WO | 2007071831 | 6/2007 |
| WO | 2011014917 | 2/2011 |
| WO | 2012074376 | 6/2012 |
| WO | 2012080499 | 6/2012 |
| WO | 2013008211 | 1/2013 |

OTHER PUBLICATIONS

International Search Report, International Application No. PCT/F12014/050706, dated Jan. 15, 2015.

*Primary Examiner* — Saul Rodriguez
*Assistant Examiner* — Brendan P Tighe
(74) *Attorney, Agent, or Firm* — Fildes & Outland, P.C.

(57) ABSTRACT

A transfer plate for loading a cargo space is disclosed. The transfer plate is intended to be moved, together with load units, into the cargo space, and out of the cargo space, while the load units remain in the cargo space. The transfer plate includes positioning means for positioning the transfer plate relative to the cargo space.

8 Claims, 5 Drawing Sheets

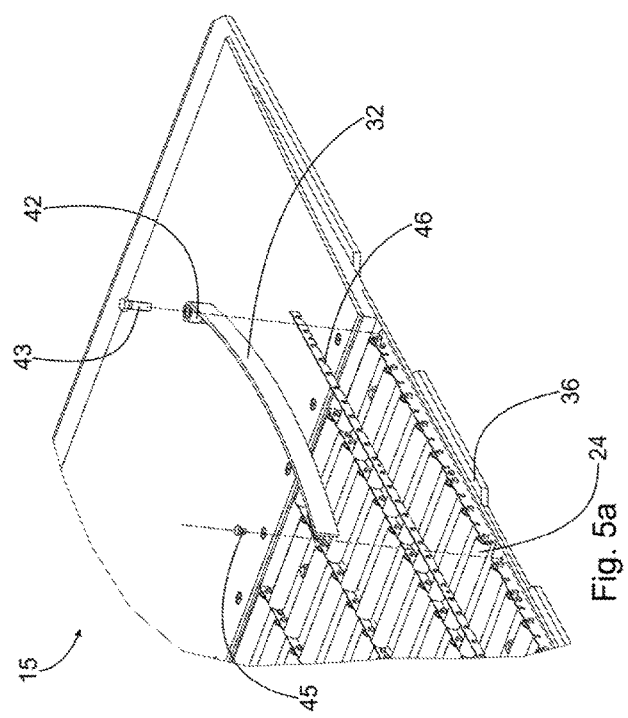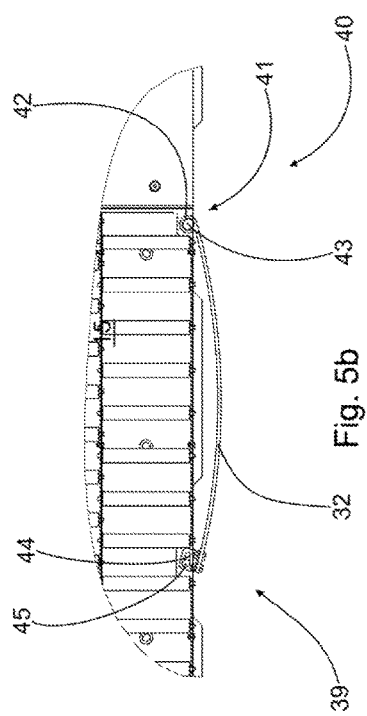

TRANSFER PLATE FOR LOADING A CARGO SPACE

TECHNICAL FIELD

The present invention relates to a transfer plate for loading a cargo space, which transfer plate is intended to be moved, together with load units, into the cargo space, and out of the cargo space, while the load units remain in the cargo space, and which transfer plate includes flexible slippery plastic that withstands both pushing and pulling.

BACKGROUND OF THE INVENTION

WO publication number 2005080132 discloses a method and apparatus for loading products to be transported into a cargo space. In the apparatus described, a transfer plate is utilized, on top of which the load is first of all formed. Next, the load, together with the transfer plate, is pushed into the cargo space, after which the transfer plate is pulled out from under the load. During the pulling, the load is supported. In the method, the products are first loaded on a transfer plate, which is outside the cargo space and is to be pushed into the cargo space. After this, the products are transferred to the cargo space by pushing the transfer plate inside over the base of the cargo space. Finally, the products are supported from the open side and the transfer space is pulled out from between the base of the cargo space and the products. In the apparatus, there is a frame and a transfer plate on it to be moved. The apparatus also includes transfer means for moving the transfer plate and products inside the cargo space and for pulling the transfer plate out from between the base of the cargo space and the products. Correspondingly, WO publication 2007071831 discloses an application of a transfer plate for loading different pallets into a cargo space. Rolling elements are located on at least part of the length of the transfer plate, so that the pallets can be pushed by a conveyor system backwards on top of the transfer plate. Correspondingly, the transfer plate can be pulled from under the pallets, while the pallets are in the cargo space, without problems of friction.

It is difficult, and often even impossible, to control a transfer plate when pushing the transfer plate, together with its load, into the cargo space. In practice, the push plate of the transfer plate is bordered by side limiters, the effect of which diminishes the farther the transfer plate is pushed into the cargo space. The lack of control can lead to damage to the transfer plate, the load, and even to the cargo space. The problem is emphasized when loading different kinds of cargo space, when the loading of each cargo space must be monitored and regulated separately. This slows loading and increases the risk of damage.

SUMMARY OF THE INVENTION

The invention is intended to create a new type of transfer plate, which is suitable for loading many kinds of cargo space. The characterizing features of the present invention are stated in the accompanying Claims. The transfer plate according to the invention surprisingly includes means for controlling the transfer plate. The transfer plate together with its load can thus be safely pushed into the cargo space without any risk of damage. At the same time, loading automation can be increased, even though the properties of the cargo spaces differ from one another.

BRIEF DESCRIPTION OF THE DRAWINGS

In the following, the invention is described in detail with reference to the accompanying drawings depicting some embodiments of the invention, in which FIG. 5a shows an axonometric view of part of a third embodiment of the transfer plate according to the invention, FIG. 5b shows a top view of part of FIG. 5a.

DETAILED DESCRIPTION OF THE INVENTION

Figure 1:
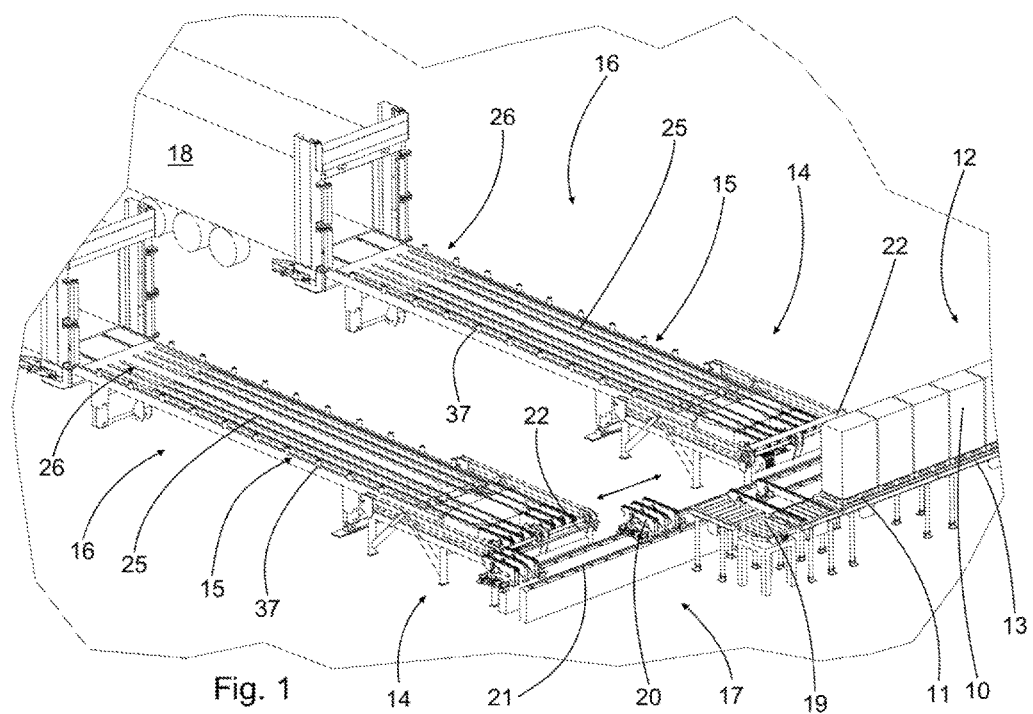
FIG. 1 shows an apparatus applying the transfer plate.

FIG. 1 shows an apparatus applying the transfer plate according to the invention. Here, the pallets 11 containing loading units 10 are brought by a roller track 13 forming a transfer conveyor 12 to the loading area, in which there are two filling devices 14 and two transfer plates 15 with transfer means 16. There can be one or several transfer means. In this case, there is an intermediate conveyor 17 between the transfer conveyor 12 and the filling devices 14. Thus, when one transfer plate 15 is being moved to the cargo space 18, the second transfer plate 15 can be being filled already. If necessary, several filling devices can be arranged in the loading area. In addition, a rotation device 19 for rotating pallets 11 is fitted in connection with the intermediate conveyor 17. The pallet can then be rotated in the final stage. At the same time, one transfer plate can even be loaded with pallets of different sizes and the placing of the pallets can be optimized. In the embodiment of FIG. 1, the intermediate conveyor 17 consists of a transfer device 20, which moves on guides from the transfer conveyor 12 to one or other of the filling devices 14. In this case, the load unit 10 is pushed from the pallets 11 by a buffer beam 22. The load units can also be placed in the filling devices by, for example, a robot or manipulator. Instead of filling devices, the load can be formed from the side of the transfer means, for example, by a fork-lift truck, or from above by, for example, a crane.

Figure 2:
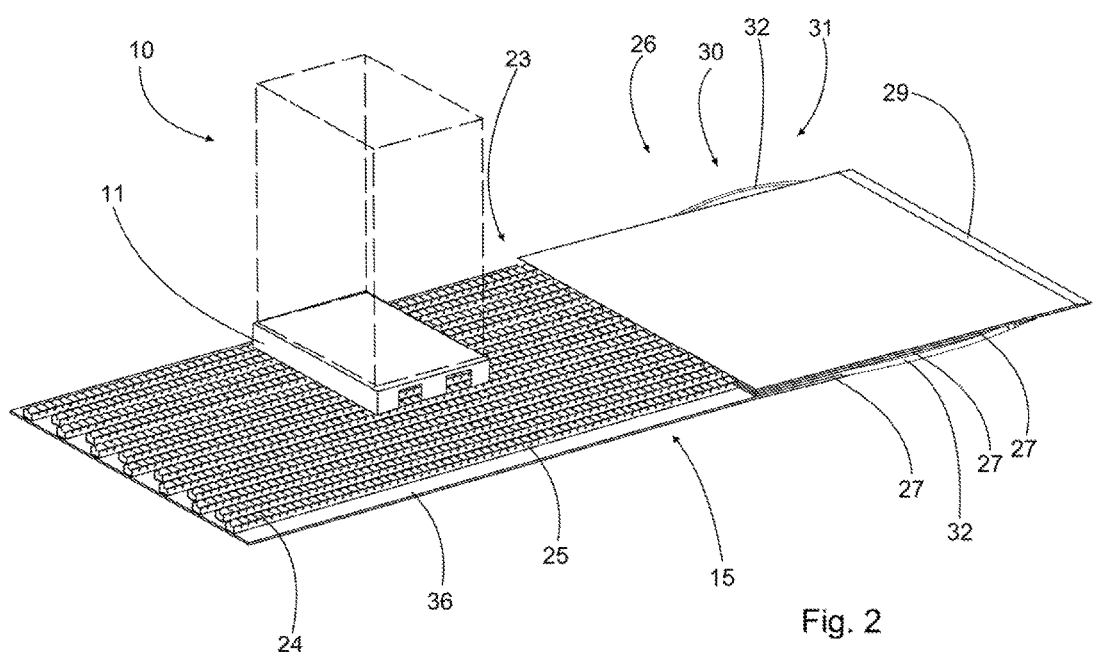
FIG. 2 shows an axonometric view of the transfer plate according to the invention.
Figure 3:
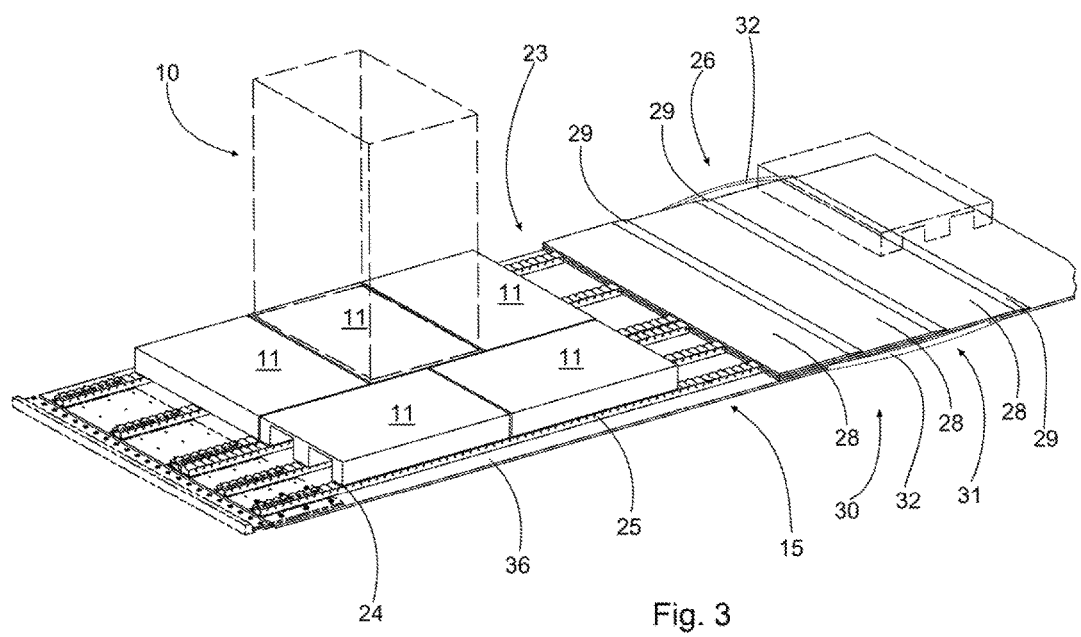
FIG. 3 shows an axonometric view of a second embodiment of the transfer plate according to the invention.

FIGS. 2 and 3 show the transfer plate 15 according to the invention, which is utilized when loading a cargo space. The transfer plate is intended to be moved, together with load units, into the cargo space and out of the cargo space while the load units remain in the cargo space. In the embodiments shown, rolling elements 23 are arranged on part of the length of the transfer plate 15, on its surface of the side with the load units 10, in order to permit movement between the transfer plate 15 and the load units 10. The formation of the load is thus facilitated and the stresses acting on the transfer plate are clearly less than those known. Also the stresses of the load units and other apparatus are less than before. On the other hand, it is possible to use only a transfer plate, on top of which the load units are placed, to be transferred to the cargo space on the transfer plate. In both embodiments, the transfer plate 15 includes a flexible slippery plastic 36 that withstands both pushing and pulling. The surface of the slippery plastic facing the base of the cargo space is smooth and the plastic material slides over the base. The transfer plate is pushed from its rear edge, but the slippery plastic is sufficiently flexible to conform to the shapes of the base of the cargo space.

The structure, size, and number of rolling elements can vary in different embodiments. In the embodiments shown, the rolling elements 23 are freely rotating rollers 24, from which roller rails 25 are formed in the longitudinal direction of the transfer plate 15. The roller rails can be only a few or closely next to each other. At the end of the transfer plate 15, a ramp is arranged from the rolling elements 23 to the cargo space. With the aid of the ramp, even sliding of the load units into the cargo space is achieved, without large drops when the transfer plate is pulled out from under the load units.

In the embodiment of FIG. 2, a functional ramp 26 is formed of plastic wedges 27, arranged as continuations of the roller rails 25. In the embodiment of FIG. 3, three plastic strips 28, in the edges of which there are in addition bevels 29, are bolted on top of the transfer plate 15, in order to form a ramp 26. The same reference numbers are used for functionally similar components.

The transfer plate 15 is mainly of plastic, being formed of slippery plastic 36, so that it slides easily along the base of the cargo space. In practice, the surface of the transfer plate opposite to that with the rolling elements is essentially smooth. In addition, the thin slippery plastic of the transfer plate conforms to unevennesses in the cargo space and even permits uneven bases in cargo spaces. In addition, the weight of the load is distributed evenly over the area of the cargo space and there can even be large openings in the cargo space. In addition, the plastic transfer plate, more specifically the slippery plastic, slides without catching on different kinds of base. The floor of the cargo space can then be, for example, of steel, wood, plywood, or aluminium.

The good sliding properties can also cause problems. For some reason, when pushing the transfer plate in it can also slide in a lateral direction. Then the transfer plate, the load unit, or even the pallet can strike the walls of the cargo space, which can even lead to serious damage. For example, the cargo space may be tilted, so that the transfer plate together with the load slides to the side by the force of gravity. Of course, the aim is always to set both the transfer means and the cargo space as evenly and horizontally as possible.

The transfer plate 15 is thus intended to be moved, together with the load units 10, into the cargo space 18 and out of the cargo space, while the load units 10 remain in the cargo space 18. According to the invention, the transfer plate 15 includes positioning means 30 for positioning the transfer plate 15 relative to the cargo space 18. Damage can then be avoided, as the transfer plate will remain in the middle of the cargo space without striking anything. This also facilitates automation of the loading.

In addition, the positioning means 30 are arranged to form part of the transfer plate 15. The transfer plate can then be used to load different kinds of cargo space, without making changes in the cargo spaces or the loading equipment. The positioning means 30 preferably consist of spring elements 31. The positioning means 30 are then self-operating, making separate operating and control devices unnecessary. The power of the spring elements is sufficient to position the transfer plate with its load. At the same time, separate control means with sensors are unnecessary. The term positioning refers mainly to centring the transfer plate in such a way that contact with the walls of the cargo space are avoided. Only the spring elements strike the wall, if the transfer plate moves away from the centre line.

In practice, the positioning means 30, in this case the spring elements 31, are attached to the transfer plate 15, preferably to the front part of it. The positioning means thus move along with the transfer plate. There are side limiters 37 in the transfer means 16, so that the transfer plate 15 moves laterally in the final stage of pushing, if it is to move at all. Thus the spring elements located in the front part react first and provide a good steering effect where it is needed. The term front part refers to the tip of the transfer plate, which is the first to enter the cargo space.

Generally, the said spring elements 31 are arranged in such a way that, in the lateral direction, sufficient force is achieved using the spring elements, without leading to structural damage. Thus a centring effect is achieved already with even a small force. A lateral correction movement is caused when the transfer plate moves, so that the question is of kinetic friction. Thus sufficient steering can be achieved with even a small force. For example, with a thirteen-tonne load the force required can be as little as less than 700 N. Thus, the force required for centring is surprisingly small, compared to the load. A wall of the cargo space will withstand the force in question without breaking and the spring element evens out the loading over a longer distance. Point and impact loadings are then avoided.

Figure 4:
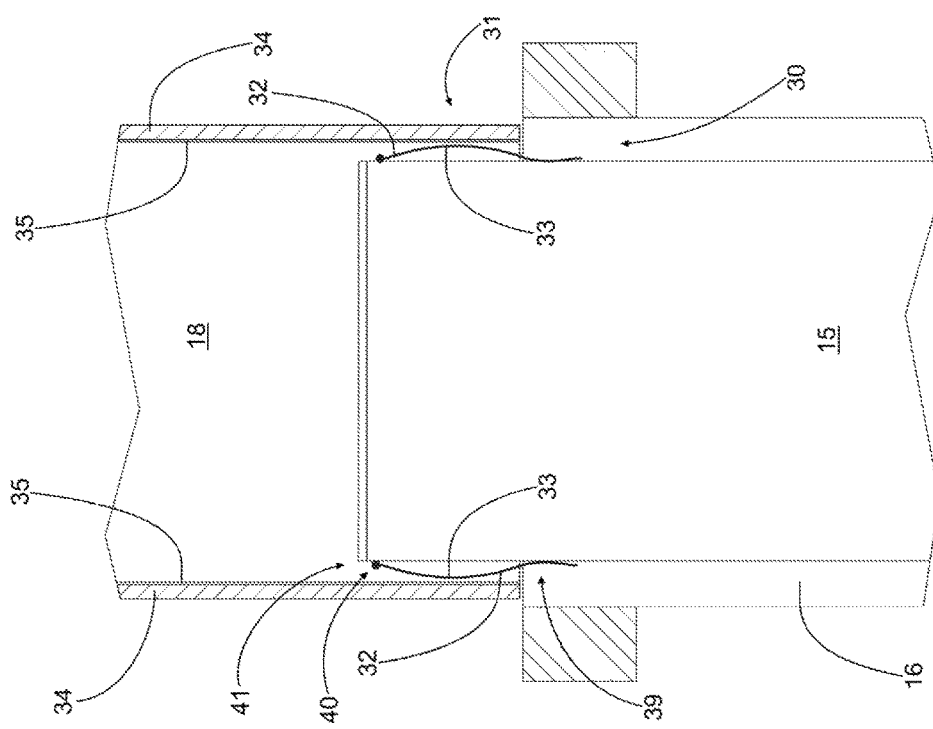
FIG. 4 shows a schematic top view of the apparatus according to the invention.

In the embodiments described, on each side of the transfer plate 15 the spring elements 31 consist of a convexly curved leaf spring 32. In other words, there is one leaf spring on each edge of the transfer plate. The convex portion 33 of the leaf spring 32 is arranged to protrude from the rest of the leaf spring 32 (FIG. 4). Thus the naturally convex portion is smoothly shaped and does not then catch on the walls 34 of the cargo space 18. On the other hand, the closer the transfer plate moves to the wall of the cargo space, the greater the centring force of the leaf spring becomes. Usually there is a batten strip on the lower edge of the wall 34 of the cargo space 18, which is intended to withstand, for example, impacts from pallets being moved by a fork-lift truck. The positioning means attached to the transfer plate are located precisely in the area of the strip, so that the wall avoids excess stresses. In practice, the leaf spring is lower than the thickness of the transfer plate, but larger than the thickness of the slippery plastic. More specifically, the leaf spring 32 is 40-60-mm wide.

A sufficient convex portion is obtained by using a long enough leaf spring. The length of the leaf spring is preferably 500-2000 mm, more preferably 800-1500 mm. The convex portion is then more than 250 mm, so that it conforms smoothly to the walls of the cargo space. At the same time, the effect is sufficiently local without being point-like.

The positioning means 30 preferably include a friction surface 38 to reduce the friction between the wall 34 of the cargo space 18 and the positioning means 30. Damage to the wall and the detrimental effect of friction forces to the operation of the transfer plate are thus avoided. For example, a piece of slippery plastic can be attached to the convex portion of the leaf spring. The slippery piece is preferably detachable. A worn slippery piece can then be replaced with a new one. In addition, the material of the slippery piece can be selected according to the material of the wall. Thus, by changing the slippery piece, the transfer plate can be fitted optimally to each cargo space.

In the embodiment described, one end of the leaf spring 32 is attached floatingly to the transfer plate 15. In practice, the leaf spring is attached at only one end, movement of the other end being permitted. Thus, it becomes possible for the length of the leaf spring to change due to deformations. More generally, the leaf spring 32 has two ends 39 and 40, one end 39 of which is attached floatingly to the transfer plate 15. Correspondingly, the other end 40 of the leaf spring 32 is attached by a pivot 41 (FIGS. 4 and 5b). Soft operation is then achieved and at the same time excess stress in the transfer plate are avoided. The leaf spring can be of, for example, a fibre-reinforced plastic composite material, which is light and by means of which significant force can be achieved with even a small thickness of material. The leaf spring can also be of steel or some other metal.

FIG. 4 shows a top view of the apparatus. The transfer means 16 is usually wider than the cargo space 18, but the transfer plate 15 is narrower than the cargo space 18. The leaf spring 32 is attached to the transfer plate at the farthest end of the transfer plate 15. Thus, when the shape of the leaf spring changes, its length can change freely.

FIG. 5a shows the formation of positioning means according to the invention. Here, there is a loop 42 at one end 40 of the leaf spring 32. The end 40 in question is attached to the transfer plate by a bolt 43, when an operational pivot 41 is created. The attachment is arranged in such a way that the leaf spring can rotate relative to the bolt. Correspondingly, the other end 39 of the leaf spring 32 is attached floatingly. Here, there is a lug 44 at the end of the leaf spring 32, which leans to the transfer plate 15. In addition, there is an elongated hole in the lug 44, which is arranged in such a way as to allow movement between the lug 44 and the bolt 45. Thus, the end of the leaf spring can move while the leaf spring remains in the correct attitude despite the loading. The slot is formed of angle iron, in which the elongated hole is formed, and which is attached to the end of the leaf spring. FIG. 5a shows, in addition to the leaf spring 32, an edge strip 46, which for its part locks the rollers 24 in place.

By means of the positioning means according to the invention, centring of the transfer plate is achieved without operating elements and changes in the cargo space. At the same time, damage can be avoided and automation increased. If necessary, the centring force can be altered by changing the spring element. Instead of a single-leaf leaf spring, a multiple-leaf leaf spring can be used. However, a single-leaf leaf spring is simple, powerful, and durable, without detrimental protrusions.

The invention claimed is:

1. A transfer plate for loading a cargo space, which transfer plate is intended to be moved together with load units into the cargo space, and moved out of the cargo space while the load units remain in the cargo space, the transfer plate comprising:
   flexible slippery plastic that withstands both pushing and pulling;
   a front, tip end, an opposite end, and two sides extending between the ends along a length of the transfer plate;
   positioning means for positioning the transfer plate relative to the cargo space, the positioning means being only at the tip end of the transfer plate, the tip end being arranged to enter the cargo space first;
   the positioning means consisting of spring elements attached to the two sides along the length of the transfer plate;
   the spring elements consisting of a convexly curved leaf spring having a convex portion that is arranged to protrude from the rest of the leaf spring and from the sides of the transfer plate, and the leaf spring having two ends, one end including a lug having a slot therein floatingly attached to the transfer plate allowing longitudinal movement of the lug relative to the transfer plate while the other end of the leaf spring is attached against longitudinal movement to the transfer plate.

2. Transfer plate according to claim 1, wherein the positioning means are self-operating.

3. Transfer plate according to claim 1, wherein the positioning means include a friction surface for reducing the friction between the wall belonging to the cargo space and the positioning means.

4. Transfer plate according to claim 1, wherein the said other end of the leaf spring is attached to the transfer plate by a pivot.

5. Transfer plate according to claim 1, wherein the leaf spring has a single leaf.

6. Transfer plate according to claim 1, wherein the length of the leaf spring is 500-2000 mm.

7. Transfer plate according to claim 1, wherein the width of the leaf spring is 40-60 mm.

8. Transfer plate according to claim 1, wherein the leaf spring is of a fibre-reinforced plastic composite material.

* * * * *